Patented Sept. 29, 1942

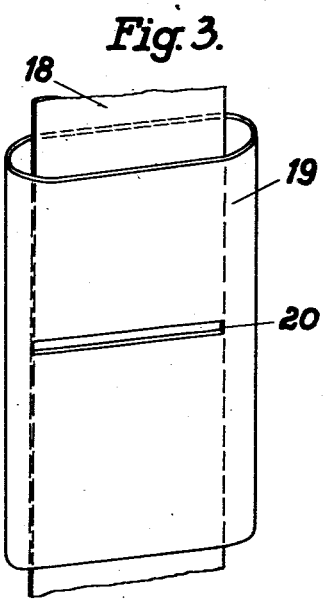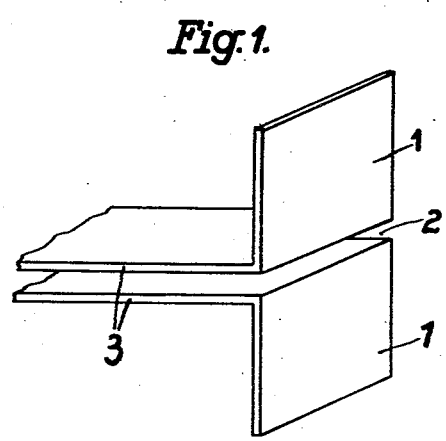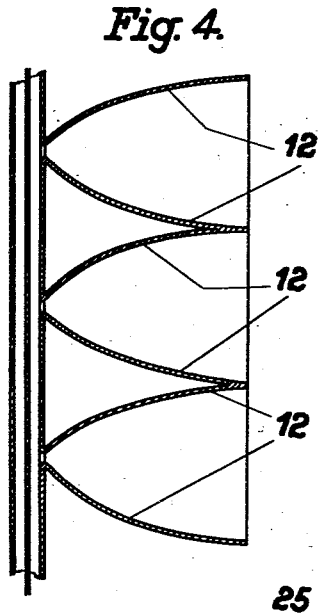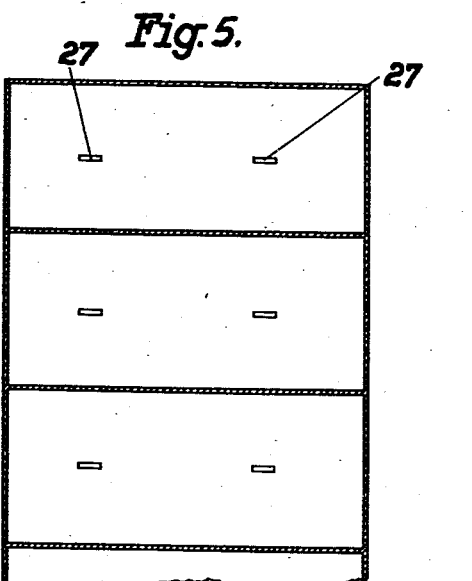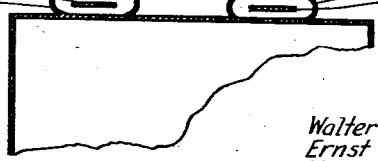

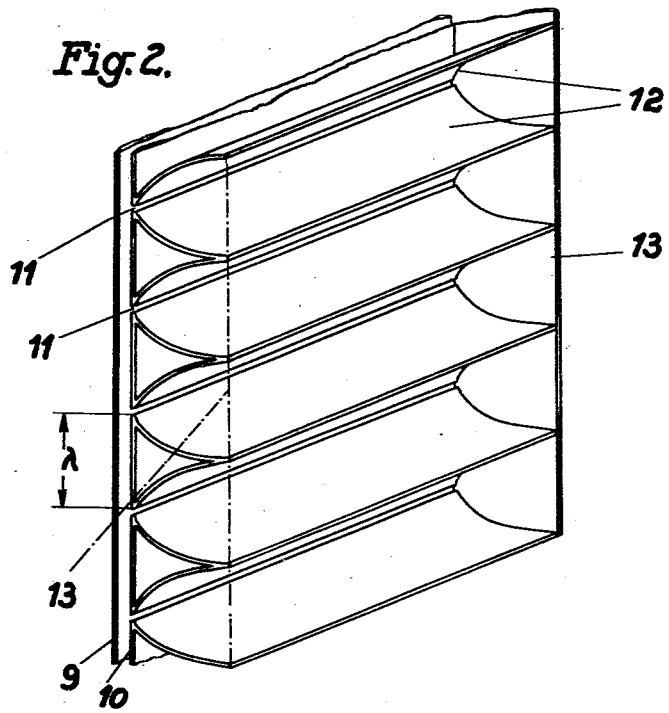

2,297,202

UNITED STATES PATENT OFFICE 2,297,202

TRANSMISSION AND/OR THE RECEPTION OF ELECTROMAGNETIC WAVES

Walter Dällenbach, Berlin-Charlottenburg, Hugo Collenbusch, Berlin-Lankwitz, and Wolfgang Pupp, Berlin-Kopenick, Germany; vested in the Alien Property Custodian Application March 5, 1937, Serial No. 129,218
In Germany March 6, 1936

1 Claim. (Cl. 250—11)

The present invention has for subject matter an apparatus for and a method of forming beams of, in particular for the directional transmission or reception of, electromagnetic waves, especially of the decimetre and centimetre range, which, when the dimensions of the apparatus are prescribed and in particular are comparable with the wave length, enable there to be obtained a maximum of the beam formation that it is at all possible to attain.

When there is allowed to impinge on a plane reflector an electromagnetic wave that is as uniform as possible, for example of the wave length $\lambda = 14$ cm., which may be received at a sufficiently great distance from the source of radiation, the formation of the reflected wave is determined substantially by the dimensions of the reflector. When the dimensions of the reflector are large in comparison with the extension of the ray and also with the wave length, the reflected wave is likewise approximately uniform. If, on the contrary the edge of the reflector is within the beam of rays, there occurs at the edge a defraction effect. This defraction effect causes a broadening of the reflected ray in such a manner that from the incident parallel ray there results after the reflection a divergent ray. If the dimensions of the reflector are made smaller and smaller, the deflection zone preponderates more and more and the divergence of the ray consequently increases.

Now, further researches with dimensions of the reflector that are comparable with the wave length have had the following results: If the dimensions of the reflector are small in comparison with the wave length, say about $\lambda/4$ or smaller, the defraction zone entirely preponderates. Only when the dimensions of the reflector are comparable with the wave length, say $\lambda/2$ or larger, does the normally reflected part preponderate over the defraction zone, but then there may occur separate phenomena, for example resonance phenomena, that either increase or diminish the defraction effect. The most favourable dimensions of a reflector comparable with the wave length are then present when they are made so great that the defraction effect is a minimum. In the case of this consideration no regard has yet been had to the fact that the defraction effect can be further reduced say by suitable formation of the edge or of the rear side of the reflector. This knowledge obtained with a plane reflector may be applied analogously to apparatus that serve for the transmission and reception of electromagnetic oscillations of very short wave length.

Now the subject matter of the present invention is an apparatus and a method particularly for the directive transmission or reception of electromagnetic waves in which a conducting surface is used directly for the transmission or reception of oscillatory energy. Now in order that the defraction effect may be small and in order that the beam formation may be somewhat large, it is necessary that the dimensions of the surface be made of the same order of magnitude as the wave length and be tuned in a suitable manner.

The object of the invention is further so to form this surface, which is excited directly to oscillation, that a wave front that is as uniform as possible comes away or that with such an arrangement a sharp directive reception is possible.

Further important characteristics of the invention consist in the suitable coupling of such a surface with an energy conducting device or a transmitting or receiving tube and in the suppression of defraction effects at the edge of the surface. Furthermore an undesirable outward or inward radiation is avoided by suitable formation of the inactive side of the bodies employed.

Figure 1 shows a simple form of antenna and conductor connected thereto;

Figure 2 shows another form of antenna including a number of curved antenna elements;

Figure 3 is a perspective view of a conductor;

Figures 4 and 5 are side and front views of an antenna and conductor comprising a number of similar antenna elements, and Figure 6 is a sectional view taken at right angles to Figures 4 and 5.

Figure 1 shows a simple constructional example according to the invention. Let I be a rectangular or maybe square plate, which is interrupted in the middle by a slit 2. The parts 3 are to form an energy-conducting device connected from behind to the edges of the slit of the plate. Let the height of this plate be made for example $\lambda/2$ and the width in the direction of the slit be made $\lambda/2$ or greater. If the energy-conducting device 3 is connected with a source of energy for example of the wave length $\lambda$ and its length so tuned that a current loop is produced at the slit 2, the plate is excited into oscillations at the front side which are preferably radiated outwards in a direction perpendicular to the plate. The outgoing ray is formed into a beam chiefly on account of the relatively large extension of the plate in the direction of the slit. The beam formation is the greater, the wider is the plate, because the percentage influence of the lateral leakage radiation occurring at the front and rear edges of the plate decreases with increasing width.

Now in order that the leakage radiation of the rear side and also that of the edges may be kept as small as possible there may be provided on the rear side and at the edge means for suppressing the formation of undesired charges or currents. Thus, for example, there may be provided at the edges or at the rear side conductors that produce there a distuning. Also it is possible by means of layers of material that absorb oscillatory energy to suppress the occurrence of injurious charges or currents and consequently an undesired inward or outward radiation. In particular, there may be selected materials in the case of which the value of the di-electric constant, permeability, and the electric conductivity are so great that in the case of quite definite layer thicknesses there is produced an optimum absorption of oscillatory energy of definite frequency or frequencies.

A further improvement of the beam formation can be further produced by making the surface that is excited to oscillations concavely arched. A corresponding constructional example is shown in Figure 2. The figure shows a plate-like body 4 which is curved parabolically in a vertical direction and the internal surface of which is to be used for the inward or outward radiation of oscillatory energy. It has been established that the beam formation in the case of such a radiator is the better, the deeper can be made the arching thereof. Advantageously the depth of the arching is made at least equal to $\lambda/2$ to $\lambda$ or greater. It has further been found that a certain tuning to the oscillation to be transmitted or to be received can be effected by the correct dimensioning of the depth of the arching and the other dimensions of the surface. On this tuning depends also substantially the still present defraction effect especially at the upper and lower edges of the surface. If the tuning is unfavourably selected so that currents still flow around this edge, the defraction effect is great; but if the dimensions of the surface are exactly so great that there occurs a potential loop at the edge, the remaining defraction is at a minimum. On account of the complicated structure of the electromagnetic field occurring in the hollow surface, no rational relationships between the wave length and the dimensions of the surface can of course be expected. As already mentioned, the beam formation in the direction of the slit of the surface can be increased as desired by increasing its dimension in this direction. There is here in question an improvement of the beam formation in the direction of the magnetic field. In order to produce also an improvement of the beam formation in the direction perpendicular thereto, there may be used a conducting surface that is excited into upper harmonics. In this case however the directional characteristic is injuriously affected, since parts of the surface oscillate with opposite phases. This disadvantage may however be obviated by suitable formation of the surface elements oscillating in opposite phases.

Figure 2 shows a constructional example in which the several radiator elements consist of concavely arched surfaces. The plate-shaped conductors 9, 10 represent an energy conducting device. The conductor 10 of this energy-conducting device is provided with slits 11 for example at equal distances apart. Parabolically arched conductors 12 adjoin these slits in such a manner that the slits are located at the crowns of these conductors. The front and rear edges of these parabolically arched surfaces are covered in each case by a common screen. If, now, there is produced on the energy-conducting device 9, 10 a stationary wave, preferably in such a manner that current loops are formed in the positions of the slits 11, the parabolically curved surfaces 12 are excited as described in the case of the example shown in Figure 2, and radiate outwards a vertically polarized wave. If the dimensions of the radiator structure are made several wave lengths great in the vertical and horizontal directions, a ray that is sharply beamed in both directions can be sent out.

The surfaces represented in Figure 2 may of course be made rotationally symmetrical and there would there be produced a tubular ray with very sharp beam formation.

In the case of the constructional example of Figure 1, the plate-like energy-conducting device open at the sides is attended by a certain disadvantage because there can occur at it radiation losses. An arrangement in which this disadvantage is avoided is shown in Figure 3. There is here in question an energy-conducting device which is widened in a surface-like fashion in a direction perpendicular to the longitudinal axis. The energy-conducting device consists of the strip-like internal conductor 18 and the external conductor 19 surrounding the internal conductor at a suitable distance away. The external conductor 19 is provided perpendicularly to the axial direction of the conducting device with a slit-like opening 20. Through this opening the external surface of the external conductor 19 is coupled with the internal space. The mode of operation of the arrangement is quite similar to that of the arrangement of Figure 1. A maximum coupling between the external surface of the concentric energy-conducting device is obtained when stationary waves are produced in the energy-conducting device in such a manner that the slit 20 is located at a potential node of the oscillations. The coupling can be varied by means of the width of the slit. When the slit is adjustable the coupling can consequently be adjusted to the most favourable width in a simple manner. The width of the slit may, further, be made so great, say equal to $\lambda/2$, that the internal conductor takes part in the outward or inward radiation. It is then advantageous to suppress the participation of the external conductor in the radiation.

The beam formation of the ray issuing from the surface in the direction of the magnetic field and consequently perpendicularly to the axis of the energy-conducting device is the better the wider are made the two conductors 18, 19. For improving the beam formation in the direction perpendicular thereto there may be employed substantially the already mentioned means. A constructional example as regards this is shown in Figures 4 to 6.

Figures 4 to 6 show in three views a constructional example which is similar to that in Figure 2 but in which two concentric energy-conducting devices 25, 26 serve for exciting the parabolically curved surfaces 12. The slits 27 in the energy-conducting devices or in the hollow bodies 12 have a distance apart approximately equal to the wave length.

In the constructional examples hereinbefore described the leading in and out of oscillatory energy of the surface excited to oscillations took place through in particular slit-like openings in the surface. The excitation of the surface may of course take place otherwise—for example by means of conductors projecting out beyond the surface through openings or extending through the surfaces at suitable places. Such a carrying out of the coupling to an energy-conducting device has provided to be specially advantageous in the case of the arched formation of the surfaces.

Now a further idea of the invention consists, as explained in reference to a transmitting arrangement, in selecting and dimensioning the hollow body in such a manner that its radiation out-going opening forms the reflecting surface and the hollow body represents an energy-conducting device between this surface and the energy entering place, and, in fact, an energy-conducting device which serves not only as an energy transmitting conduit per se but rather is so dimensioned that the reflection is a minimum at the place of the passing out of the radiation into the open and the radiation resistance ($R_s$) of the radiation out-going surface is advantageously maximumly suited to the resistance of the source of potential of the energy-conducting device. The two requirements may be fulfilled by making the characteristic impedance ($Z$) and the length ($x$) of the energy-conducting device such as to correspond to the formula $$R_i = \frac{R_s + iZ \tan \frac{2\pi x}{\lambda}}{1 + i\frac{R_s}{Z} \tan \frac{2\pi x}{\lambda}}$$

In particular the length ($x$) of the energy conducting device may be made equal or approximately equal to $\lambda/4$, so that the characteristic impedance for the maximum suiting is given by the formula $Z^2 = R_s . R_i$.

In many cases it is advantageous instead of this to form the hollow body as a, maybe composite, energy-conducting device of greater length (than $\lambda/4$), in particular as an energy-conducting device the characteristic impedance of which changes from the value R to the value $R_s$ continuously (i. e. not jerkily but gradually), for example according to an e-function. There are then conditions similar to those of the so-called horn loud speaker in acoustics, but with the advantage that in the present case in the dimensioning only a single wave length need be taken into account and therefore agreement and radiation relationship can be established substantially more favourably. If, according to the invention, the hollow body is used as an energy-conducting device with a continuously changing characteristic resistance in the way stated, there is thus presented inter alia the possibility of reducing the dependence of the frequency on the agreement. This may present considerable advantages as regards the wave changing of a transmitting station, in some cases also in the case of receiving stations. According to the invention the radiation out-going opening of the hollow body is such that it has the most favourable radiation resistance possible—generally the greatest possible radiation resistance. The radiation resistance of the out-going surface may in many cases be calculated with sufficient accuracy from the formulae that have been given for the radiation resistances in the case of rectangular, elliptical, and circular plates or membranes in acoustics. The circular out-going opening generally presents particular advantage. Its diameter in many cases is advantageously a half wave length—variations within certain limits are in this case quite allowable.

When mention has been hereinbefore made of the resistance of the source of potential of the energy-conducting device formed by the hollow bodies, there is to be understood thereby for example, the characteristic impedance of an energy-conducting device that conducts the radiating energy to the hollow body. When intermediate members are interposed between the two energy-conducting devices, there is to be applied as the resistance $R_i$ of the source of potential the resistance transmitting to the coupling place. If the hollow body is excited to oscillations (as represented in the constructional example explained above), for example by means of a slit opening in a concentric energy-conducting device, regard is to be had in respect of the magnitude of the resistance $R_i$ to the coupling between the slit opening and the hollow body.

Heretofore it has been usual to use surface-like radiators exclusively as reflectors—i. e. a Herz dipole or a Marconi antenna was inserted into a surface-like radiation. The spatial radiation issuing from this di-pole or this antenna impinged upon the surface and was reflected in the desired direction by it by means of the currents excited in the surface. These surface-like radiators which are excited by the primary radiation issuing from the antenna, have been called reflectors. As the experiments that have led to the constructions set forth in the preceding description show, there is, however, possible a direct excitation of such a surface-like radiator, for example from an energy-conducting device or from a generating tube. This takes place most simply by providing according to the invention in the surface of the surface-like radiator, for the directive transmission or reception of ultra high frequency electromagnetic oscillations preferably of the decimetre or centimetre range, one or more openings transversely to the edging of which flow currents which couple the surface, conducting the active currents, of the radiator with an energy-conducting device or with a generator or receiver of ultra high frequency oscillations.

Instead of solid-walled or metal sheet-like surfaces, surfaces consisting of wire fabric may be used in all the constructional examples shown in the drawings.

When there are connected to one and the same energy-conducting device, several surface-like radiators united to form a group radiator, it is possible to place the preferably slit-like connecting openings between the concentric energy-conducting device on the one hand and the surface-like radiator on the other hand either at potential loops or at potential nodes of the energy-conducting device. In the case of arrangements at potential loops, the currents engaging over the edging of the openings are comparatively small and the coupling between the surface-like radiator and the energy-conducting device is a loose one. If on the contrary, these openings are at potential nodes larger currents flow over the edging of these openings, and the coupling of the surface-like radiator to the concentric energy-conducting device is a rigid one. Between the coupling at a potential loop and the coupling at a potential node all intermediate stages are possible, so that any desired degree of coupling can be realised. The coupling can be further influenced by the form and magnitude of the openings; for example adaptable slots may be provided. Such steps are always of importance when a larger number of surface-like radiators are coupled to one and the same energy conducting device, so that there occurs in the interior of the energy conducting device a potential drop and consequently the field amplitude existing at the coupling opening in the interior of the energy-conducting device has not one and the same magnitude for each individual surface-like radiator. As regards the group action it is however frequently necessary to excite the several surface-like radiators in the same way or in ways that differ from one another but are predetermined in order to obtain the desired radiation diagram. In such cases use may be made with advantage of the possibility of shifting the openings or varying the dimensions of the different openings of the group arrangement.

Instead of using a concentric energy-conducting device for the excitation of the active surface of a surface-like radiator, it is possible for example to pass an ordinary two-wire conductor through two openings of the surface-like radiator and to their ends to terminate by way of capacity or galvanically on the active surface of the surface-like radiator.

What we claim is:

Apparatus for sending or receiving ultra high frequency electromagnetic vibrations comprising a plurality of conducting surfaces serving as antennae, each conducting surface being of a width in each direction of the order of magnitude of the wave length and having each dimension equal to at least about one-half wave length, each conducting surface being parabolically curved with its axis extending in the direction of transmission, each surface having an opening in its apex, a conductor comprising an outer tubular metal member and an inner metal member, said conductor being connected to the antennae at the openings thereof and having corresponding openings in the outer tubular member, the conductor being of a length to provide current loops at each point of connection to the antennae.

WALTER DÄLLENBACH.
HUGO COLLENBUSCH.
WOLFGANG PÜPP.